US011818168B2

(12) United States Patent
Ben-Yosef et al.

(10) Patent No.: US 11,818,168 B2
(45) Date of Patent: *Nov. 14, 2023

(54) MONITORING FOR LATERAL MOVEMENTS-RELATED SECURITY THREATS

(71) Applicant: Cymulate Ltd., Rishon Lezion (IL)

(72) Inventors: Avihai Ben-Yosef, Tel Aviv (IL); Eyal Aharoni, Zur Yigal (IL); Shmuel Ur, Shorashim (IL)

(73) Assignee: CYMULATE LTD., Rishon Lezion (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,908

(22) Filed: Jul. 26, 2022

(65) Prior Publication Data

US 2022/0368722 A1    Nov. 17, 2022

Related U.S. Application Data

(63) Continuation of application No. 16/738,389, filed on Jan. 9, 2020, now Pat. No. 11,438,373.

(51) Int. Cl.
| | |
|---|---|
| *G06F 21/00* | (2013.01) |
| *H04L 9/40* | (2022.01) |
| *G06F 16/901* | (2019.01) |
| *G06F 17/18* | (2006.01) |

(52) U.S. Cl.
CPC ...... *H04L 63/1466* (2013.01); *G06F 16/9024* (2019.01); *G06F 17/18* (2013.01); *H04L 63/1425* (2013.01); *H04L 63/166* (2013.01)

(58) Field of Classification Search
CPC ............. H04L 63/1466; H04L 63/1425; H04L 63/166; G06F 16/9024; G06F 17/18
See application file for complete search history.

(56) References Cited

U.S. PATENT DOCUMENTS

| | | | |
|---|---|---|---|
| 10,873,590 B2 | 12/2020 | Gordeychik | ........ H04L 63/1416 |
| 10,896,085 B2 | 1/2021 | Chevalier | ............ G06F 11/0793 |
| 11,201,890 B1 | 12/2021 | Coull | ................... H04L 63/1433 |
| 2017/0078322 A1 | 3/2017 | Seiver | ...................... H04L 41/12 |

(Continued)

FOREIGN PATENT DOCUMENTS

CN      110909878 A      3/2020      ............. G06F 17/18

OTHER PUBLICATIONS

List of Patents or Patent Applications Treated as Related dated Jul. 22, 2022, 2 pgs.

*Primary Examiner* — Michael M Lee
(74) *Attorney, Agent, or Firm* — Tutunjian & Bitetto, P.C.

(57) ABSTRACT

Method, product and apparatus for monitoring for security threats from lateral movements. A method comprises obtaining a graph of network lateral movements, that comprises nodes, representing network assets, and directed edges, representing a network lateral movement from a source asset to a target asset. An event that affects the graph of network lateral movements is detected. The event affects at least one of: the payload utility of the node and the probability of penetration to the node. The graph of network lateral movements is updated based on the event. The updated graph is analyzed to determine one or more mitigation actions to be applied. The one or more mitigation actions are applied automatically, manually or the like.

18 Claims, 5 Drawing Sheets

(56) References Cited

U.S. PATENT DOCUMENTS

| | | | |
|---|---|---|---|
| 2018/0276377 A1 | 9/2018 | Griffin | G06F 9/445 |
| 2018/0288079 A1 | 10/2018 | Muddu | G06N 20/20 |
| 2018/0316704 A1 | 11/2018 | Joseph Durairaj | H04L 41/142 |
| 2018/0367548 A1* | 12/2018 | Stokes, III | H04L 63/1416 |
| 2019/0042737 A1 | 2/2019 | Krebs | H04L 63/1416 |
| 2019/0124112 A1 | 4/2019 | Thomas | H04L 63/0209 |
| 2020/0177618 A1* | 6/2020 | Hassanzadeh | G06F 21/552 |
| 2021/0203684 A1 | 7/2021 | Maor | H04L 63/1433 |

* cited by examiner

MONITORING FOR LATERAL MOVEMENTS-RELATED SECURITY THREATS

CROSS-REFERENCE TO RELATED APPLICATIONS

This application is a continuation of and claims the benefit of U.S. patent application Ser. No. 16/738,389 filed Jan. 9, 2020, titled "MONITORING FOR SECURITY THREATS FROM LATERAL MOVEMENTS", which is hereby incorporated by reference in its entirety without giving rise to disavowment.

TECHNICAL FIELD

The present disclosure relates to cybersecurity in general, and to cybersecurity of networks, in particular.

BACKGROUND

Network lateral movement is a technique used by hackers and other malicious users to systematically move through a network. This technique is often used to identify, gain access to and exfiltrate sensitive data. Once an attacker penetrates into a network, the attack may use different techniques to gain higher privileges and access, allowing her to move laterally through the network. Based on the access she gained to one asset, the attacker gains access to different assets in what is considered a "sideway" movement, also referred to as lateral, moving between devices and apps. This is performed to map the system, identify targets and eventually obtain a valuable payload.

In some cases, if the attacker is able to secure administrative privileges, malicious lateral movement activities can be difficult to detect, and it may appear as normal network traffic.

BRIEF SUMMARY

One aspect of the disclosed subject matter is a method comprising: obtaining a graph of network lateral movements, wherein the graph comprises nodes and directed edges, wherein a node of the graph represents an asset of a network, wherein a direct edge of the graph connecting a source node to a target node represents a network lateral movement from a source asset, represented by the source node, to a target asset, represented by the target node, wherein the graph indicates for a node at least one of: a payload utility of the node and a probability of penetration to the node; detecting an event that affects the graph of network lateral movements, wherein the event affects at least one of: the payload utility of the node and the probability of penetration to the node; updating the graph of network lateral movements based on the event, whereby obtaining a modified graph; analyzing the modified graph to determine one or more mitigation actions to be applied; and providing the one or more mitigation actions to be applied.

Optionally, said updating the graph of network lateral movements comprises: updating a probability of penetration directly to a node.

Optionally, said updating the graph of network lateral movements comprises: updating a payload utility of a node.

Optionally, said updating the graph of network lateral movements comprises: updating a probability of successful network lateral movement from a source node to a target node.

Optionally, said updating the graph of network lateral movements comprises at least one of: updating a probability of penetration directly to a node; updating a payload utility of a node; and updating a probability of successful network lateral movement from a source node to a target node.

Optionally, said analyzing comprises analyzing a previously activated mitigation action; and wherein application of the one or more mitigation actions comprises deactivating the previously activated mitigation action.

Optionally, an edge in the graph of network lateral movements is associated with one or more methods enabling network lateral movements that comprise at least one of: a Pass the Hash (PtH) technique; a Pass the Ticket (PtT) technique; a modification of a logon script; a Remote Desktop Protocol (RDP) attack; and a Server Message Block (SMB) relay attack.

Optionally, the method further comprises: prior to said detecting: performing an offline analysis to determine a set of one or more mitigation actions to be applied and applying the set of one or more mitigation actions; wherein said analyzing comprises determining to activate a mitigation action not included in the set of one or more mitigation actions.

Optionally, the method further comprises: monitoring usage of the network, wherein said detecting is performed in response to said monitoring, wherein said monitoring comprises identifying usage patterns, wherein said analyzing comprises determining estimated reduction in usability of a mitigation action based on the identified usage patterns.

Optionally, the method further comprises: detecting a second event that affects the graph of network lateral movements, wherein the second event affects at least one of: the payload utility of the node and the probability of penetration to the node; updating the modified graph of network lateral movements based on the second event, whereby obtaining a second modified graph; analyzing the second modified graph to determine at least one mitigation action to be applied; and providing the at least one mitigation action to be applied.

Optionally, said analyzing the modified graph comprises: computing a utility of an application of a plurality of mitigation actions, wherein the utility of a mitigation action is computed based on a reduction in an estimated loss from penetration; selecting a subset of the plurality of mitigation actions based on the computed utilities; and wherein said providing comprises applying the subset of the plurality of mitigation actions.

Optionally, the estimated loss from penetration is computed as a summation of estimated loss from penetration to each node of the graph, wherein an estimated loss from penetration to a node is computed based on probability of penetration directly to the node and based on payload utility of nodes that are reachable from the node.

Optionally, the utility is computed based on the reduction in the estimated loss from penetration, based on an estimated cost of applying the mitigation action, and based on a reduction in usability caused by the mitigation action; wherein the utility is a monotonically increasing function with respect to the reduction in the estimated loss from penetration; wherein the utility is a monotonically decreasing function with respect to the estimated cost of applying the mitigation action; and wherein the utility is a monotonically decreasing function with respect to the reduction in usability caused by the mitigation action.

Optionally, said providing the one or more mitigation actions to be applied comprises automatically applying the one or more mitigation actions.

Optionally, said providing the one or more mitigation actions comprises outputting a suggestion to apply the one or more mitigation actions.

Another aspect of the disclosed subject matter is a non-transitory computer readable medium retaining program instructions, which program instructions when read by a processor, cause the processor to perform: obtaining a graph of network lateral movements, wherein the graph comprises nodes and directed edges, wherein a node of the graph represents an asset of a network, wherein a direct edge of the graph connecting a source node to a target node represents a network lateral movement from a source asset, represented by the source node, to a target asset, represented by the target node, wherein the graph indicates for a node at least one of: a payload utility of the node and a probability of penetration to the node; detecting an event that affects the graph of network lateral movements, wherein the event affects at least one of: the payload utility of the node and the probability of penetration to the node; updating the graph of network lateral movements based on the event, whereby obtaining a modified graph; analyzing the modified graph to determine one or more mitigation actions to be applied; and providing the one or more mitigation actions to be applied.

Another aspect of the disclosed subject matter is an apparatus comprising a processor and a memory unit, wherein said processor is configured to perform: obtaining a graph of network lateral movements, wherein the graph comprises nodes and directed edges, wherein a node of the graph represents an asset of a network, wherein a direct edge of the graph connecting a source node to a target node represents a network lateral movement from a source asset, represented by the source node, to a target asset, represented by the target node, wherein the graph indicates for a node at least one of: a payload utility of the node and a probability of penetration to the node; detecting an event that affects the graph of network lateral movements, wherein the event affects at least one of: the payload utility of the node and the probability of penetration to the node; updating the graph of network lateral movements based on the event, whereby obtaining a modified graph; analyzing the modified graph to determine one or more mitigation actions to be applied; and providing the one or more mitigation actions to be applied.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
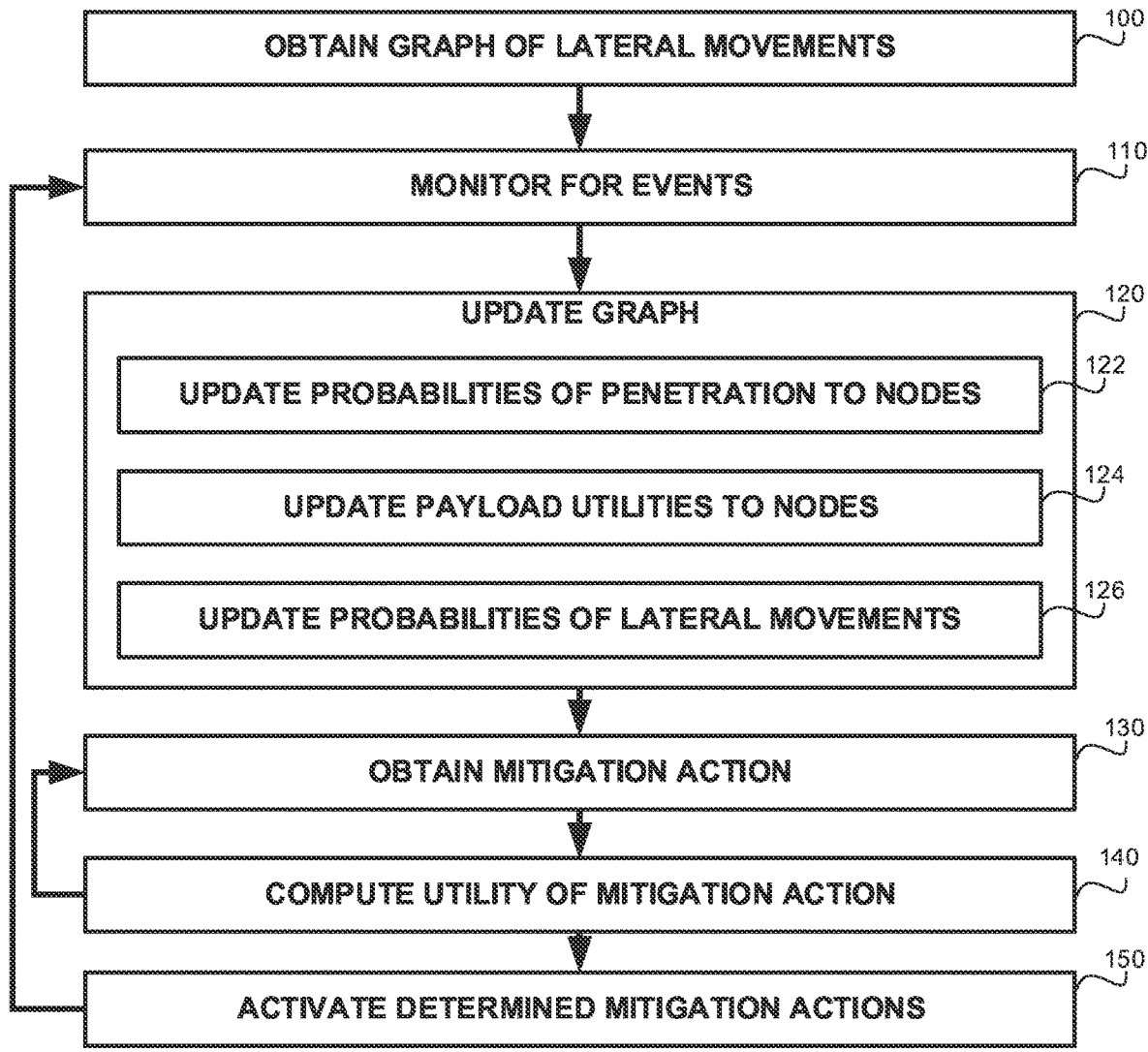
FIG. 1A-1C show flowchart diagrams of methods, in accordance with some exemplary embodiments of the disclosed subject matter.

One technical problem dealt with by the disclosed subject matter is to provide a means to identify and analyze security threats from network lateral movements. In some cases, network lateral movements may pose a serious security threat to an organization, as a single susceptible asset may expose congenital information in assets that can be reached from the penetrated asset, and in some cases even the entire network.

Another technical problem dealt with by the disclosed subject matter is to provide for an automated manner for suggesting a mitigation action to improve security of the network. In some cases, it may be desired to evaluate whether a potential mitigation action provides a benefit or not. In some cases, a mitigation action may be performed without providing positive utility. As an example, the mitigation action may not prevent any penetration scenario. Additionally, or alternatively, the mitigation action may prevent penetration scenarios that relate to low-priority assets having insignificant payloads. Additionally, or alternatively, the mitigation action may require a substantial resource investment in order to be applied. Additionally, or alternatively, the mitigation action may reduce usability of the network, as it may create obstacles that interfere with legitimate activities of non-malicious users.

Yet another technical problem dealt with by the disclosed subject matter is to provide a "just-in-time" suggestion, to mitigate risk as it increases. Additionally, or alternatively, it may be desired to determine whether or not to continue activating some mitigation actions or determine they can be deactivated.

One technical solution is to utilize a graph of network lateral movements for a network, defining which lateral movements are possible from which asset to which asset.

In some exemplary embodiments, the graph may be generated based on an analysis of the network. In some exemplary embodiments, the graph of network lateral movements may be determined using static analysis, dynamic analysis, combination thereof, or the like. As an example, static analysis of the network may be performed to determine, for each asset, potential network lateral movements, and dynamic analysis (e.g., penetration testing) may be utilized to validate or invalidate each potential network lateral movement.

In some exemplary embodiments, nodes in the graph may represent assets in the network. In some exemplary embodiments, for each asset, relevant properties may be determined automatically or obtained from a user. The properties may include, for example, a list of opened ports. In some cases, specific ports may be of interest, such as ports that are used for attacks (e.g., port 445, 135, 3389, or the like). In some exemplary embodiments, the properties may include a list of executed services that may be executed by the asset. In some cases, specific executed services may be of interest, such as services that can be relied upon for attacks (e.g., Server Message Block (SMB), Windows Management Instrumentation (WMI), Distributed Component Object Model (DCOM), Remote Desktop Protocol (RDP), Secure Shell (SSH) or the like). In some exemplary embodiments, the properties may include indications regarding the usage of protection mechanisms. For example, it may be determined whether an anti-Man-In-The-Middle (MITM) mechanism, such as SMB signaling is enabled or not.

In some exemplary embodiments, an edge from a source asset to a target asset in the graph may indicate which method or exploit can be used to perform the network lateral movement from the source asset to the target asset. The methods may include, for example, Pass the Hash (PtH) technique, Pass the Ticket (PtT) technique, a modification of a logon script, a Remote Desktop Protocol (RDP) attack, a Server Message Block (SMB) relay attack, or the like.

In some exemplary embodiments, the graph of network lateral movements may be an organization lateral movement map that shows vulnerability. The graph may be displayed in a visual manner to the user, showing potential vulnerabilities, indicating possible lateral movements in the network, and the like. In some exemplary embodiments, the visualization may show the graph and indicate where one can get from one place to another. In some cases, connected components of the graph may be displayed as a single element, and bridges connecting therebetween may be displayed. The user may perform drill down to obtain a detailed view of a connected component. In some exemplary embodiments, color-coding of the nodes of the graph may be utilized such as to indicate which assets are currently vulnerable, and which are not. Vulnerability may be determined based on a probability of penetrating directly to the node or indirectly via other nodes and network lateral movements therefrom. As an example, a node having a probability above a high threshold may be presented in red, a node having a probability below the high threshold but above a low threshold may be presented in yellow, and a node having a probability below the low threshold may be presented in green. Additionally, or alternatively, color-coding may be utilized to indicate whether care should be taken with respect to the node. In some cases, a node that has a probability of penetration above a high threshold and whose payload value is above a threshold may be color-coded in red. A node whose payload value is below the threshold may be color coded in green regardless of the penetration probability thereof. A node whose payload value is above the threshold, and whose probability of penetration is above a low threshold and below the high threshold, may be displayed in yellow. In some exemplary embodiments, any node having an estimated loss from penetration above a high threshold may be color coded in red, any node having an estimated loss from penetration in between a low threshold and a high threshold may be colored in yellow, and any node having an estimated loss from penetration below the low threshold may be colored in green. Estimated loss from penetration may be a computed based on payload value of the reachable nodes that can be reached therefrom via network lateral movements, and based on the probabilities to penetrate the node and to reach other nodes after penetrating it. It is noted that the disclosed subject matter is not limited to the above examples and other color-codings may be applied in accordance with the disclosed subject matter. In some exemplary embodiments, edges between nodes may be annotated, such as using labels or colors, based on techniques that can be employed to traverse the edge in a network lateral movement. In some exemplary embodiments, a probability of penetration to an asset may be determined. A node representing the asset may be annotated, such as using labels or colors, accordingly.

In some exemplary embodiments, based on real-time information, the risk level of each asset being directly penetrated, may be determined. Additionally, or alternatively, based on real-time information, the risk level of each asset being penetrated indirectly, e.g., via the usage of network lateral movements, may be determined. Additionally, or alternatively, based on real-time information, the utility of the payload of each asset may be determined.

Additionally, or alternatively, payload utility may be determined for each node. The payload utility may indicate the utility to the attacker from reaching the payload of the asset. Additionally, or alternatively, the payload utility may indicate to disadvantage to the network owner from the penetration to the payload. In some exemplary embodiments, confidential information may be associated with a relatively high payload utility, indicating that such payload should be protected. A node representing an asset may be annotated, such as using labels, colors, or the like, to indicate the payload value.

In some exemplary embodiments, given the graph of network lateral movements, a security agent may be aware of how an attacker can move from one asset to another. It may also be known how to block such movements. However, mitigating actions that prevent certain network lateral movements may not necessarily be performed. The reason for avoiding such actions may be due to a cost of implementation, reduction in usability, or the like.

In some cases, there may be cost of applying a mitigation action. Such cost may be associated with resources that are invested in the application and implementation of the mitigation action. Additionally, or alternatively, the application of the mitigation action to users may cause an inconvenience to legitimate users, which may reduce usability of the network. In some cases, the network may be analyzed to determine the reduction in usability. For example, logs may be obtained and analyzed to determine whether the potential inconvenience would reduce actual usability of the network. In some cases, the mitigation action may prevent a legitimate user from autonomously performing an action, such as due to requiring higher-level permission, and would require that she request assistance from an administrator. If such action is common, the mitigation action adversely affect the usability in a substantial manner. If, on the other hand, the action is rare, the effect on usability may be limited.

In some exemplary embodiments, an estimated loss from penetration function may be defined. The value of the estimated loss from penetration function may be computed based on the graph of network lateral movements. The estimated loss from penetration function may be utilized as a part of a target function in optimizations regarding security risk from network lateral movements. In some exemplary embodiments, the Estimated Loss from Penetration (ELP) function may be computed as a follows: $(G)=\Sigma_{\forall n} ELP(G, n)$, where G is the graph of network lateral movements that comprises assets and is indicative of reachability via network lateral movements therebetween, n is an asset in G, and ELP(G,n) is the estimated loss from penetration to n, which may be computed as $ELP(G, n)=p(n) \cdot \Sigma_{m \in Reach(m)} pl(m)$ In some exemplary embodiments, p(n) is penetration probability to the asset n, pl(m) is the payload utility of asset m, and Reach(n) is the set of assets that are reachable in G from n (including n itself). Additionally, or alternatively, ELP of a node may be computed while taking into consideration that there are different probabilities of successful network lateral movements to each asset. ELP may be computed as $ELP(G, n)=p(n) \cdot \Sigma_{m \in Reach(n)} pl(m) \, pr(n, m)$, where pr(n,m) is the probability of successful network lateral movement from n to m. In some exemplary embodiments, there may be different probabilities that an attacker can perform a specific network lateral movement. In some exemplary embodiments, the probabilities may be defined per attacker, such that all network lateral movements are of the same probability. Additionally, or alternatively, there may be different probabilities to the same type of lateral movement method in different edges. In some cases, going through multiple. In some exemplary embodiments, successfully reaching an asset may not necessarily mean that the payload of the asset is compromised. The pr(n,m) function may also take into account the probability of the payload of the asset m to be exploited.

In some exemplary embodiments, estimated loss from penetration may be utilized as a quantitative measure that can be used to determine whether to perform a mitigation action. In some cases, if the estimated loss from penetration is not reduced by a mitigation action, such action should not be performed. In some cases, two different mitigation actions may yield a same outcome and therefore may be interchangeable.

In some exemplary embodiments, a utility of a mitigation action may be computed based on the graph of network lateral movements. The utility of a mitigation action act may be defined based on a reduction in the estimated loss from penetration due to the mitigation action, also denoted as RELP(G,act). In some exemplary embodiments, RELP(G, act)=ELP(G)−ELP(APP(G, act)), where RELP is the reduction in estimated loss from penetration function of the action act in view of graph G, ELP(G) is the estimated loss from penetration of a graph G, APP(G, act) is the modified graph that is obtained after the mitigation action act is applied in G. In some exemplary embodiments, the utility function (U) may be defined exactly based on the RELP function (e.g., U(G, act)=RELP(G, act)). Additionally, or alternatively, the utility function may be computed as U(G, act)=RELP(G, act)−C(act)−RU(act), where C(act) is the cost of applying the mitigation action act and RU(act) is the reduction in usability due to the mitigation action act. In some cases, the values of each function RELP, C, and RU may be normalized to a same scale, weighted, or the like.

In some exemplary embodiments, a mapping between mitigation actions and methods of performing network lateral movements may be determined, manually, automatically, or in combination thereof. In some exemplary embodiments, for each mitigation action, methods or exploits it prevents may be listed, so as to allow identification of edges that can be removed when such action is implemented. Additionally, or alternatively, the cost of applying the mitigation may be provided for the mitigation action. Additionally, or alternatively, the reduction in usability in view of mitigation action may also be included in the mapping. As an example, one mitigation action may be to change a weak password of a user having high-level privileges. Such mitigation action may be useful against various techniques such as guessing password, utilizing a password cracking tool and brute force password enumeration. The cost of applying the mitigation action may include the resources that are invested in the user having to take a short action, which is estimated to take about a minute. The reduction in usability may be associated with the user having to remember a harder password. A non-limiting exemplary table exemplifying a mapping is shown below. It is noted that in some cases organizational users may not be adversely affected depending on the quality of the solution implemented by the IT department. However, even in such cases, the IT staff may experience reduction in usability.

| Mitigation action | Method or exploits | Cost | Reduction in usability |
| --- | --- | --- | --- |
| Remove <strong user> from Service Principle Name (SPN) on the domain controller | Kerberoasting | 1 week of IT work | Affects IT: Create a user dedicated for the service with limited permissions |
| Change weak password of a user, Set account lockout policies after a certain number of failed login attempts. | guessing password; utilizing a password cracking tool; brute force password enumeration password spraying | 5 minutes of user work to reset password 1 hour of IT work to configure the policy | Affects Users: Passwords are harder to remember. Users occasionally get locked-out and require IT assistance. A denial of service condition may occasionally occur, rendering environments unusable. |
| Create a registry key to deny credential dumping. Do not put user or admin domain accounts in the local administrator groups across systems unless they are tightly controlled, as this is often equivalent to having a local administrator account with the same password on all systems. Follow best practices for design and administration of an enterprise network to limit privileged account use across administrative tiers. Consider disabling or restricting New Technology LAN Manager (NTLM) | Credential Dumping | Depending on complexity: either 1 hour of IT work or several days of development work | Affects IT: Old software's might use old authentication protocols so updating them to restrict the usage of old ways to authenticate and pass/save credentials; Affects users: users may be limited by the software they can use. |
| Do not use the same password for the built-in local administrators. Do not allow a domain user to be in the local administrator group on multiple systems. Apply patch KB2871997 to Windows 7 and higher systems to limit the default access of accounts in the local administrator group. | Pass the Hash (Domain/Local) | 1 week of IT work | Affects IT: IT will need to deploy the change of the Local Administrator Password on all of the machines in the network. Affects Users: in some cases, the users may not be supported efficiently by the IT Support. |

-continued

| Mitigation action | Method or exploits | Cost | Reduction in usability |
| --- | --- | --- | --- |
| Need to implement a solution to manage local built-in administrator password for IT/support team usage | | 2 weeks of IT and development work There may be costs to ensure the solution is secure. It may be required to purchase additional hardware or software. | Affects IT: Requires the usage of an additional tool to manage the passwords and remote assistance capabilities for the IT Support team. Affects users: may require users to use tools they are unfamiliar with. |
| Disable Link-Local Multicast Name Resolution (LLMNR) and Network Basic Input/Output System (NetBIOS) in local computer security settings or by group policy if they are not needed within an environment. Use host-based security software to block LLMNR/NetBIOS traffic. Enabling SMB Signing | LLMNR/NBT-NS Poisoning and Relay | 1 day of IT work | Affects IT: Some legacy software might not function properly due to usage of restricted protocols or due to usage of unsupported ways to authenticate and pass/save credentials. There may be additional work for the IT staff in view of such restrictions when users use the system. Affects users: may restrict usage of certain software that utilize restricted authentication protocols |
| Block SMB/WMI/DCOM/SSH protocols between systems. | Network Protocols | 1 week of IT work | Affects IT: Need to create firewall rules to block different ports from different VLAN's to block lateral movement used protocols. |

In some exemplary embodiments, the costs and reductions in usability may be provided in the mapping in numerical or quantitative manner, so as to enable the usage thereof in computing the value of the utility function. It is noted that costs and reduction in usability may be organization specific.

In some exemplary embodiments, monitoring may be employed to determine, in real-time, updates to the mitigating actions that are implemented in the network. In some exemplary embodiments, the disclosed subject matter may monitor for events that may affect the decision of performing mitigating actions. In some exemplary embodiments, the events may potentially affect the utility function, such as by affecting the reduction in the estimated loss from penetration due to the mitigation action (RELP), the probability of success in performing a lateral movement (pr(n,m)), the penetration probability of an asset (p(n)), the payload utility of an asset (pl(m)), the reduction in usability (RU), or the like. In some exemplary embodiments, the events may indicate a possibility that an asset was already penetrated.

In some exemplary embodiments, some events may indicate that a potential attack has already occurred. This may indicate that a node is already breached. In some exemplary embodiments, the indications may be indications that are insufficient to determine with high confidence (e.g., with confidence above a threshold) that the asset was breached. In some exemplary embodiments, the indication may be an indication of an estimated loss therefrom is below a threshold. The estimated loss may be the estimated probability that the breach has occurred multiplied by the estimated payload reachable therefrom. Such estimated loss may take into account the payload values of payloads that are reachable from the potentially breached asset, as well as the probability that the breach had indeed occurred. It is noted that in real-life deployed networks there may be many such events, most of which may be false positives. As a result, it may be hard to examine each such potential breach individually, and attackers may hide within the "noise" of false positive alarms.

In some exemplary embodiments, it may be monitored to detect attempts of attacks that are unsuccessful and for which a potential breach alert may not be triggered. As an example, consider a phishing email which is tailored for a specific user. Even if the attempt is unsuccessful, based on the targeting of the specific user, the risk of penetration to the user's account may be considered as increased.

In some exemplary embodiments, external networks and external databases may be monitored to determine changed likelihood of attacks. For example, based on information available over the Internet, it may be determined that currently fin-tech corporations are being attacked. As another example, dark web content may indicate that the someone has targeted the organization. As yet another example, discovering breached payload of the organization in the Internet may indicate that a specific asset within the organization has been penetrated.

In some exemplary embodiments, based on the monitored information, the graph may be updated in real-time, and decisions may be taken in real-time, such as employing mitigating actions to reduce the risk to the organization. In some exemplary embodiments, mitigating actions may have already been considered and implemented based on offline, static information. In some exemplary embodiments, the decision regarding such mitigating actions preventing network lateral movements or making such movements harder, may be re-examined. It is also noted that in some cases, some mitigating actions that have been employed in the past may be deactivated, potentially reducing security of the network and improving usability thereof for legitimate users.

In some exemplary embodiments, the actual usage of aspects of the network may be monitored to re-evaluate reduced usability. For example, if a mitigating actions against credential dumping is considered, the reduced usability for users may be based on preventing them from using legacy software. By monitoring actual use of software by the users, it can be determined whether this poses actual limitation to the users of the organization or not. In some cases, some users may suffer from reduced usability due to such limitation, while others may be indifferent thereto. As yet another example, it may be monitored to determine how the requirement of each user to use harder-to-remember password affects them. In case the user get accustomed to the new password without a problem, this may indicate that there's no reduced usability. However, some users may suffer from such a requirement, and get locked out repeatedly, requiring assistance from the IT department often. For such users, the reduced usability may be considered as increased in comparison to the original estimation. The original estimation may be determined based on information regarding similar users, benchmark users, or the like.

In some exemplary embodiments, the mitigating actions may be suggested automatically, in view of the information gathered during the monitoring phase. The mitigating actions may be implemented automatically, semi-automatically, manually, or the like. After a mitigating action is implemented, it may be deactivated or otherwise be undone, such as when the risk assessment related thereto becomes reduced and below a threshold.

In some exemplary embodiments, during monitoring, attack signals may be detected. The attack signals may be examined to determine information about the attacker. The information may relate to which lateral movements the attacker tends to perform. For example, if the attack signals indicate that the attacker is a member of a hacking group that often uses Remote Desktop Protocol (RDP) attacks, then the probability of such attacks occurring may be considered as increased (e.g., pr(m,n,RDP) may be increased, where pr is the probability of a successful network lateral movement from m to n using type of network lateral movement that is denoted by t), while the probability of other attacks may remain unaffected. In some exemplary embodiments, the probability may be increased in the nodes for which the attack signals were detected, or for nodes connected thereto. In some cases, the probability may be increased for the node for which the signal was detected, and for all nodes connected thereto by a number of network lateral movement (e.g., all types of movements or of the RDP type) that is below a threshold N. The threshold N may depend on the time elapsed since the occurrence time of the event from which the attack signal was discovered. For example, it may be determined that for every 12 hours that elapse, the attacker may perform an additional lateral movement. In such an example, N may be computed as N=Time/12, assuming Time is the elapsed number of hours.

In some exemplary embodiments, mitigation actions to be performed may be automatically suggested. In some exemplary embodiments, the reasoning behind the suggestion may be provided to the user, using visualizations, such as by showing alternatives. In some cases, a mitigation action may be performed for all assets in the organization, for a specific asset, or the like. The suggestion may be to perform a set of one or more mitigation actions. In some exemplary embodiments, each set of one or more mitigation actions may be evaluated, by calculating the utility of applying the set of one or more mitigation actions. An optimal set may be determined and suggested. In some cases, the optimization may be performed so as to maximize the utility function while adhering the maximal allowed cost (e.g., available resources) and maximal acceptable reduction in usability.

In some exemplary embodiments, bridges in the graph of network lateral movements may be identified. In some exemplary embodiments, a bridge may be an edge in the graph that connects between two connected components. In some exemplary embodiments, a mitigation action that is configured to remove the bridge may be determined and suggested to the user, in view of information obtained during the monitoring process. In some exemplary embodiments, mitigation actions that remove bridges may be considered first, prior to evaluating mitigation actions that relate to non-bridge edges, such as edges within cycles and within connected components. Additionally, or alternatively, in view of newly obtained information, in view of re-evolution of risk due to the passage of time in which no new relevant events were identified (or a reduced number of events were identified), mitigation actions that were previously implemented may be deactivated and removed.

It is noted that in some embodiments, due to monitored information an attack may be identified with a confidence measurement above a threshold. In such a case, a notification may be provided to the user, and the user may investigate the matter further and decide on which actions to take. However, in most cases, potential attacks may be identified with confidence measurement below a threshold, e.g., below 70%, 60%, 50%, 40%, or the like. In such cases, the detection may be false positive detection, and if the user is notified, the user may learn to ignore such notifications. In accordance with the disclosed subject matter, instead of notifying the user, an automated mitigation action may be determined and implemented in real-time and on-demand, in view of the elevated risk. Such operation may mitigate the potential risk from the detected attack, if the detected attack is a true positive and not a false positive, while avoiding the burden of having a user manually handle many false positive notifications.

One technical effect of utilizing the disclosed subject matter is obtaining a clear assessment of security risks to an organizational network from an attacker's ability to perform network lateral movements. Such assessment may indicate that a low-level asset, that is accordingly being protected using low-standards, is in fact a weak link and represents a potential breach point into the high-level payloads of the organization.

Another technical effect of utilizing the disclosed subject matter is to improve security of an organizational network. In some exemplary embodiments, the disclosed subject matter may be utilized to optimize security given limitations on adverse effects on usability and on overall resources available to perform mitigation actions. It is noted that the mitigation suggestions in accordance of the disclosed subject matter are immune to biases, as opposed to suggestions by domain experts. The suggestions do not favor simple mitigation actions that are easy to implement, nor do they necessarily focus on protecting a high value payload directly. The novel quantitative metrics employed by the disclosed subject matter enable to identify high-impact mitigation actions, avoid performing redundant mitigation actions that provide no positive affect on the security level of the network, and select an optimal set of suggestions. It is noted that the optimal set may not necessarily be the global optimum, but rather the best set out of the ones examined, a set having a value of a target optimization function above a threshold (e.g., "good enough" solution), or the like.

Yet another technical effect of utilizing the disclosed subject matter is real-time provisioning of effective mitigation actions in view of a current risk assessment. Instead of relying on a one-time, static, analysis of the risks to the organization and network, the disclosed subject matter enables real-time assessment of the risk, and automated activation and deactivation of mitigation actions. On-demand activation of the mitigation actions achieves effective solution to reduce security risk, on one hand, and on the other, reduces the inconvenience caused to the legitimate users. In some cases, the behavior of the legitimate users may be monitored to determine the adverse effect of mitigation actions, and to improve the determination of which mitigation action to activate and under what conditions.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 100, a graph of lateral movements may be obtained. The graph may comprise nodes representing assets in the network. The graph may comprise directed edges from source nodes to target nodes, where an edge indicates that a network lateral movement can be implemented from the source node to the target node of the edge. In some exemplary embodiments, an edge corresponds to a validated network lateral movement from the asset represented by the source node to the asset represented by the target node. In some exemplary embodiments, each node in the graph may be assigned a probability of penetration to the asset represented thereby. The probability may depend on the likelihood of an attack, protection measures employed with respect to the asset, or the like. The probability may be determined automatically based on rules and historical information of similar assets, such as datasets indicating attacks or datasets of manually provided estimated probabilities. In some exemplary embodiments, deep learning or machine learning may be employed to estimate the probability. Additionally, or alternatively, a domain expert may be utilized to provide insight into the probability.

In some exemplary embodiments, payload utilities may be assigned to nodes. A payload utility of the asset represented by the node may indicate the value of the payload at the asset, the damage from exposure of the payload, the estimated damage from an attacker gaining access to the payload (e.g., in view of a probability of the attacker exploiting the payload), or the like. A domain expert may determine the payload utility of a node. Additionally, or alternatively, the payload utility may be determined automatically based on rules or in view of similar payloads by the same organization, of similar organizations, or the like. In some exemplary embodiments, deep learning or machine learning may be employed to estimate the payload utility of an asset in an automated manner.

In some exemplary embodiments, an edge may be labeled to indicate a method for performing network lateral movement over the edge, e.g., from the source node to the target node. In some exemplary embodiments, each node may be labeled by a single label, and there may be multiple edges from the same source to the same target. Additionally, or alternatively, each node may be labeled by a plurality of labels, representing all methods that can be employed in order to effectual the lateral jump over the edge.

In some exemplary embodiments, the graph may be generated using static analysis of the network, using dynamic analysis of the network, or the like. In some exemplary embodiments, the graph may be generated in accordance with the disclosure of U.S. patent application Ser. No. 16/671,631, filed Nov. 1, 2019, and entitled "SECURITY THREATS FROM LATERAL MOVEMENTS AND MITIGATION THEREOF", which is hereby incorporated by reference in its entirety for all purposes without giving rise to disavowment. Additionally, or alternatively, the graph of lateral movements may be obtained from a third party, from a repository, or the like.

On Step 110, monitoring may be performed for events. In some exemplary embodiments, events may be events related to the organization, the network, the assets of the network, or the like. In some exemplary embodiments, monitoring may be performed using local agents deployed on assets, using a central server monitoring communication, or the like. In some exemplary embodiments, databases and external networks may be monitored, such as threats database, the dark web, the Internet, or the like.

In some exemplary embodiments, events that may be identified may be indicative of a potential threat increase or decrease. In some exemplary embodiments, the events may indicate a potential breach to the network. In some exemplary embodiments, a confidence measurement of the potential breach may be evaluated and in case it is above a predetermined threshold, it may be reported immediately to a human user to be addressed. In some exemplary embodiments, most potential breaches may be evaluated to a confidence measurement below the predetermined threshold, and may be analyzed and handled in accordance with the disclosed subject matter. It is noted that events having a confidence measurement above the threshold may be handled similarly in addition to or instead of being reported directly to an administrator or other IT personnel.

On Step 120, the graph may be updated. The graph may be updated in view of one or more monitored events of Step 110. In some exemplary embodiments, the graph may be updated in response to identifying an event on Step 110. Additionally, or alternatively, the graph may be updated periodically, such as once an hour, once a day, once a week, or the like, in view of the events identified in the passing time period.

On Step 122, probabilities of penetration to a node may be updated. In some exemplary embodiments, some events may indicate a higher likelihood that an asset has been penetrated. For example, if the initial likelihood is 10%, events that are indicative of the node being already penetrated may increase the likelihood to 25%. It is noted that in some cases, the increased likelihood may be determined based on the confidence measurement of the event, such as if the confidence measurement is 100%, the probability may be increased to 100%, and if the confidence measurement is 20%, the probability may be increased by 20%. Additionally, or alternatively, some events may indicate a higher risk to a specific asset. For example, a dark web bulletin board targeting a specific asset may increase the risk that someone may attempt penetrating the asset. As a result, the probability of penetration may be increased. It is also noted, the probabilities may be updated to be decreased. As an example, consider a potential breach that was identified. If no follow-up events in accordance with known attack patterns are identified, it may be considered more likely that the identification of potential breach was a false positive indications and the probability may be accordingly reduced. Hence, future events or lack thereof may be utilized to ratify previous decisions regarding penetration probabilities. As yet another example, outdated bulletin board notices may be considered as defunct and no longer justify an increase probability of penetration. Similarly, in some embodiments removed notices, e.g., a request for information that was previously posted and removed thereafter, may also be utilized to reevaluate the probability of penetration. Such an event may indicate that future penetrations are less likely, as there is a reduced incentive to do so. In some cases, such an event may indicate that past penetrations are more likely, as the active removal of the notice may indicate that the information was already obtained.

In some exemplary embodiments, manual sweeps and other security related activities may be considered as removing potential breaches. For example, if there was a risk of 40% that computer X was penetrated to, if the administrator re-installs computer X using a fresh image, it may be considered as an event that cleanses computer X from all previous potential breaches. Hence, in view of such event, the probability of computer X being penetrated may be reduced to the probability that someone may penetrate it in the future and ignore the probability that someone has already penetrated it in the past, before its re-installation.

On Step 124, payload utility of nodes may be updated. In some exemplary embodiments, the payload utility may indicate the utility to the attacker from reaching the payload of the asset. Additionally, or alternatively, the payload utility may indicate to disadvantage to the network owner from the penetration to the payload. In some exemplary embodiments, confidential information may be associated with a relatively high payload utility, indicating that such payload should be protected. The payload utility may be updated, such as in view of monitored events. In some exemplary embodiments, the payload utility modification may be based on trends that are identified in the Internet, dark web, or the like. Additionally, or alternatively, the payload utility may be based on specific organization-specific events that indicate the payload of the organization. As an example, if biometric information becomes information of interest to hackers, the utility of nodes retaining such information may be elevated. As another example, if a software becomes defunct, the asset retaining credentials thereof may be considered as having a reduced payload utility. As yet another example, in case an organization was previously breached and discredited by exposing a specific type of payload, the payload utility of similar payloads may be increased, as another exposure of such payload may be of even more discrediting in view of the previous incident.

On Step 126, probabilities of lateral movements may be updated. In some exemplary embodiments, there may be a myriad of methods and techniques for performing lateral movements, such as but not limited to Pass the Hash (PtH) technique, Pass the Ticket (PtT) technique, a modification of a logon script, a Remote Desktop Protocol (RDP) attack, a Server Message Block (SMB) relay attack, or the like. In view of the monitored events, the likelihood that a specific lateral movement technique may be employed may be increased or decreased. For example, if the organization is being attacked using a specific pattern, than the probability that the technique used by the pattern would be employed is increased all over the graph. Additionally, or alternatively, the increase may be localized to a specific region of the graph, such as based on geographic location, on semantic relationship, organizational roles, or the like. As another example, in case there was a potential breach that was identified using one technique (e.g., PtH technique), then there may an increased likelihood of PtH technique being using in assets that are nearby the potentially penetrated asset. Proximity and nearby relationship may be based on time elapsed. For example, a Breadth First Search of depth X may be used to define nearby assets, where the depth X is defined based on elapsed time since the potential breach.

On Step 130, a mitigation action may be obtained. The mitigation action may be obtained from a database of potential mitigation actions. In some exemplary embodiments, the database may comprise a mapping between mitigation actions and methods of performing network lateral movements. Mitigation actions that are relevant to the methods that can be employed to perform lateral jumps in the graph may be obtained. In some exemplary embodiments, the mitigation action being evaluated may be a set of mitigation actions, such as a same action applied on different assets, different mitigation actions applied on the same asset, different mitigation actions applied on different assets, or the like.

On Step 140, a utility of the mitigation action may be computed. The utility may be computed, such as, using the utility function $U(G, act)$. Additionally, or alternatively, the utility may be computed based on a reduction in an estimated risk of penetration that can be computed based on the graph of network lateral movements. The estimated risk may be computed for the original graph and for a modified graph that represents application of the mitigation action. In some exemplary embodiments, the estimated risk of penetration may be computed as a summation of estimated risk of penetration to each node of the graph. The estimated risk of penetration to a node may be computed based on the probability of penetration directly to the node and based on payload utility of nodes, include the penetrated node, that are reachable from the node in the graph of network lateral movements. In some exemplary embodiments, the estimated risk of penetration may be computed as a summation of the probability of penetration to the node, multiplied by the probability of being able to reach a target node from the node (e.g., by performing one or more lateral movements), multiplied by the payload utility of the target node. It is noted that the summation may also refer to the payload utility of the node, for which the probability of being able to reach the node from the node may be considered as 100%. Additionally, or alternatively, the probability in such a case may be less than 100%, such as if the payload itself may be protected by another mechanism internally within the node, if the payload is obscure, if extraction of the payload is hard (e.g., large file), or the like.

In some exemplary embodiments, the utility of the mitigation action may be computed using a function that is monotonically increasing with respect to reduction in the estimated loss from penetration. In some exemplary embodiments, given all other factors the same, if there is a reduction in the estimated loss, the utility function may provide at least the same utility value (or higher) as it provides without the given reduction. Generally, the larger the reduction in the estimated loss, the greater the increase in the utility.

In some exemplary embodiments, the utility of the mitigation action may be computed using a function that is monotonically decreasing with respect to an estimated cost of applying the mitigation action. In some exemplary embodiments, given all other factors the same, if there is a decrease in the estimated cost of applying the mitigation action, the utility function may provide at least the same utility value (or higher) as it provides without the given decrease in the estimated cost. Generally, the larger the decrease in the estimated cost of applying the mitigation action, the greater the increase in the utility.

In some exemplary embodiments, the utility of the mitigation action may be computed using a function that is monotonically decreasing with respect to a decrease in usability caused by the mitigation action. In some exemplary embodiments, given all other factors the same, if there is a decrease in usability caused by the mitigation action, the utility function may provide no more than the same utility value (or lower) as it provides without the given decrease in usability caused by the mitigation action. Generally, the larger the decrease in usability caused by the mitigation action, the greater the decrease in the utility.

In some exemplary embodiments, the utility function may be computed as U(G, act)=RE LP(G, act)— C (act)— RU (act). As can be appreciated, the function U(G,act) is monotonically increasing in RELP, monotonically decreasing in C and monotonically decreasing in RU. Other functions the provide similar characteristics may be employed.

In some exemplary embodiments, Steps 130-140 may be performed for a plurality of alternative mitigation actions, enabling to choose therebetween using the utility computed on Step 140.

On Step 150, one or more mitigation actions may be activated. In some exemplary embodiments, suggested mitigation actions may be provided to the user. In some exemplary embodiments, the suggestion may be provided to a user, such as an owner of the network, an administrator thereof, a security expert, or the like. The user may accept or reject the suggestion. In some exemplary embodiments, the user may modify the suggestion and implement the modified suggestion. In some exemplary embodiments, the mitigation action may be implemented without user approval. In some exemplary embodiments, the suggested mitigation action (or modification thereof) may be implemented. The users of the network may take part in the implementation of the mitigation action. In some exemplary embodiments, the mitigation action may be performed automatically, semi-automatically, or the like. In some exemplary embodiments, the mitigation action may require user cooperation, such as in replacing a password. An automated process may force the user to cooperate, such as by forcing the user to change her password.

In some embodiments, an optimization problem may be defined to determine the optimal set of mitigation actions to apply. The optimization problem may be:

$$\text{Max} \max_{act} U(G, act),$$

subject to:

$$\sum_{act} C(act) \le \text{Max Cost},$$

$$\sum_{act} RU(act) \le \text{Max } RU.$$

MaxCost and MaxRU may represent a maximal acceptable cost of applying mitigations and reduced usability, respectively. The optimization problem or approximation thereof may be automatically solved to identify a set of mitigation actions to be performed so as to maximize the utility therefrom on the one hand, and adhere to limitations on the inconvenience and costs of the mitigation actions.

In some exemplary embodiments, following the dynamic determination and activation of mitigation actions, Steps 110-150 may be re-performed. In some exemplary embodiments, mitigation actions may be activated selectively and on-the-fly in view of events that were identified on Step 110.

Figure 1B:
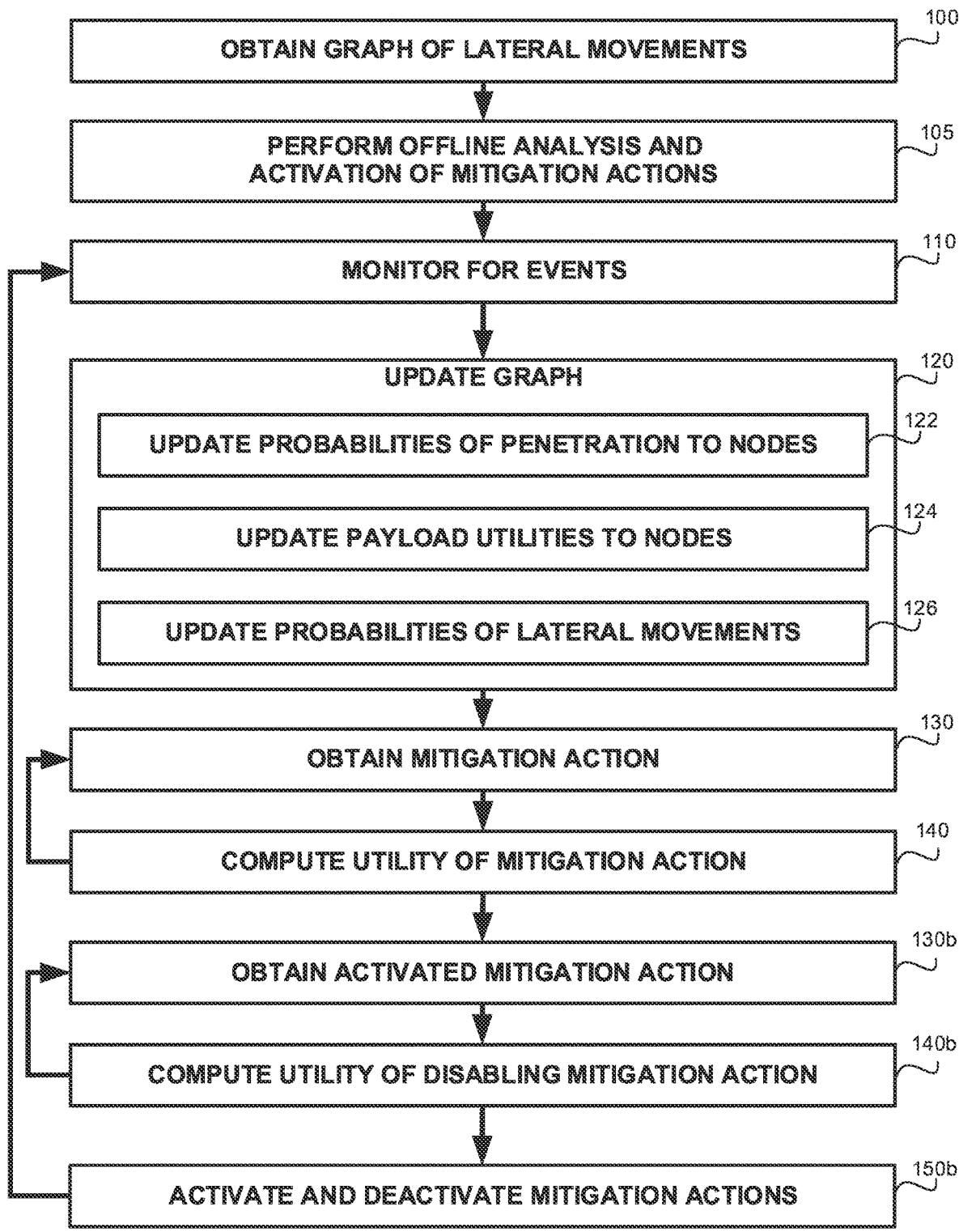

Referring now to FIG. 1B showing a flowchart diagram of a method, in accordance with some exemplary embodiments of the disclosed subject matter.

On Step 105, offline analysis may be performed. Offline analysis may be an initial analysis that is performed prior to event monitoring (110). In some exemplary embodiments, offline analysis may include analysis of an optimal set of mitigation actions in view of the initial graph of lateral movements.

On Step 130b, a set of activated mitigation actions may be obtained, each of which may be analyzed to determine the utility of disabling the mitigation action (Step 140b). The activated mitigation actions may be mitigation actions activated a-priori, in an offline manner (Step 105) or dynamically, in an online manner (Step 150b in view of the determination in Step 140). In some exemplary embodiments, in order to improve performance and reduce computational complexity, a heuristic approach may be implemented. For example, the heuristic may be based on the historic utility from the mitigation action, which may be retained and utilized in order to determine whether or not to include the mitigation action as part of the optimization problem.

Figure 1C:
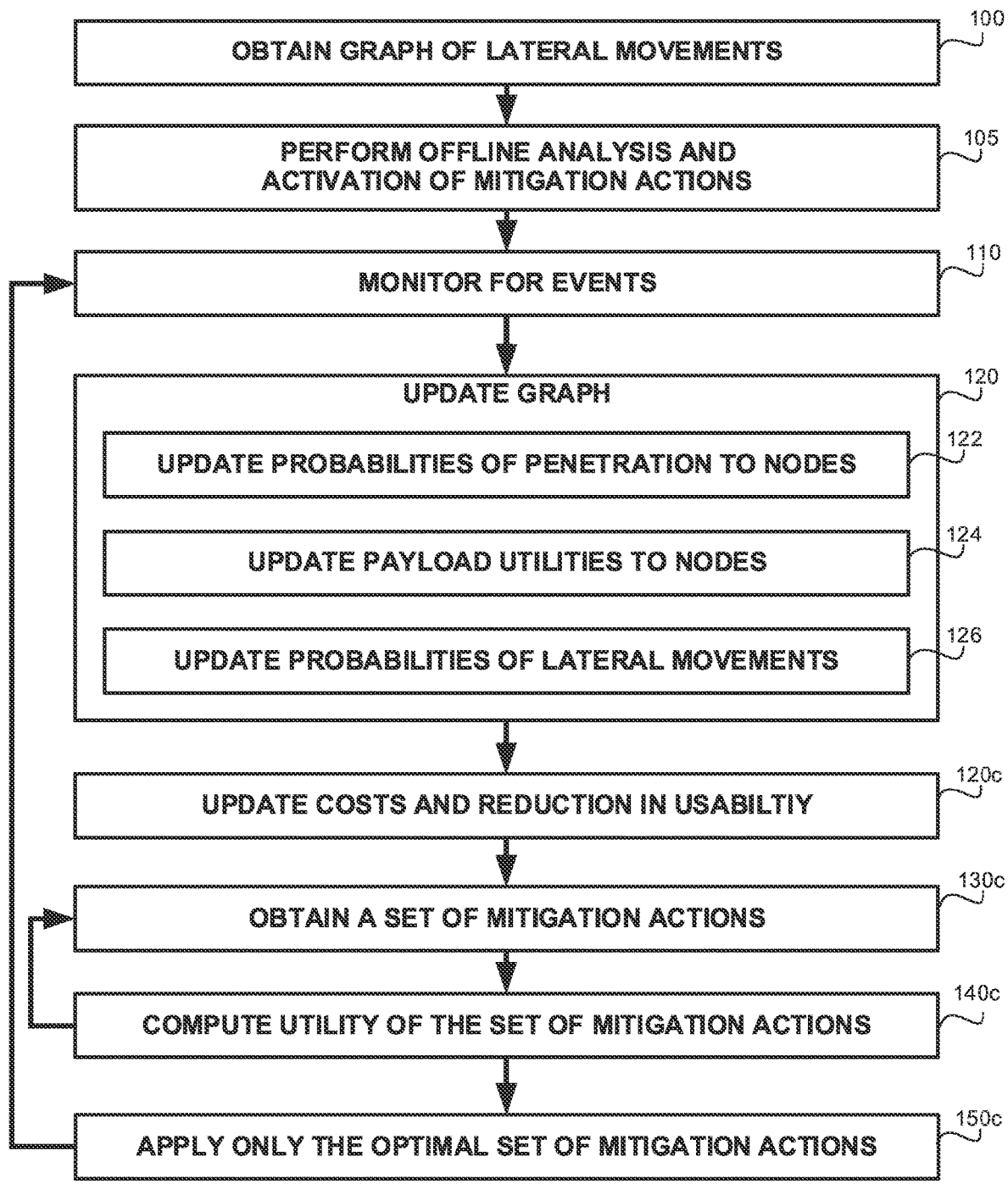
Figure 2A:
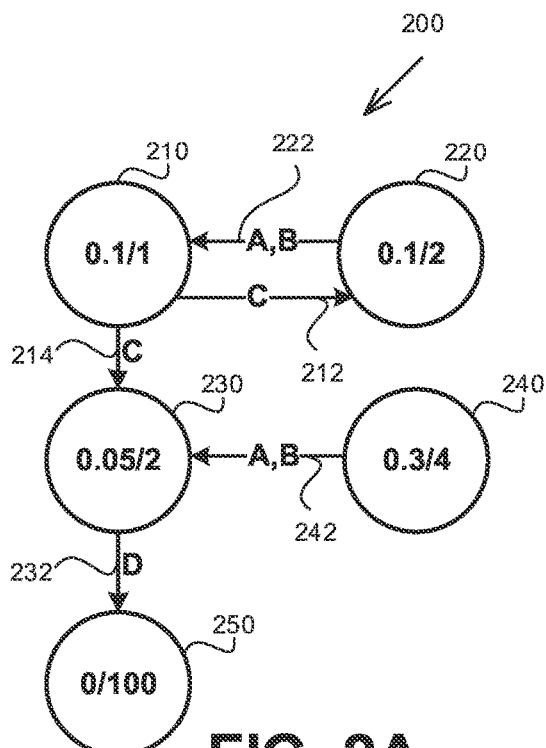
FIGS. 2A-2D show illustrations of graph of network lateral movements, in accordance with some exemplary embodiments of the disclosed subject matter.
Figure 2B:
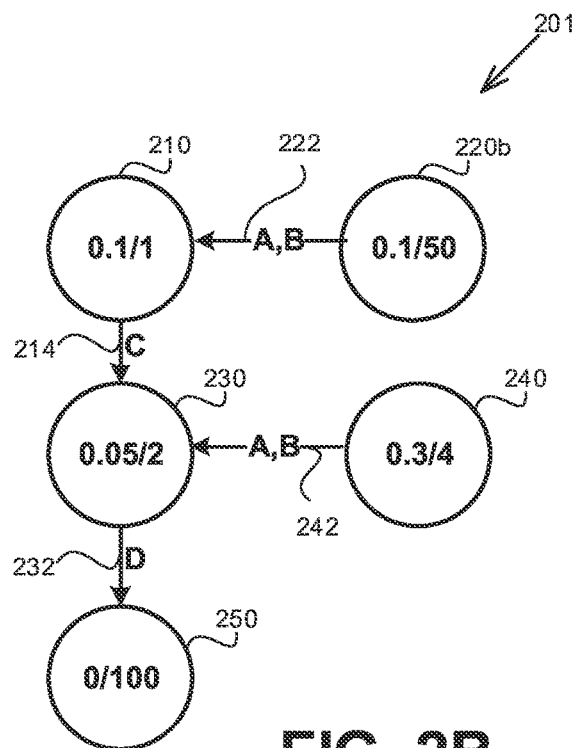
Figure 2C:
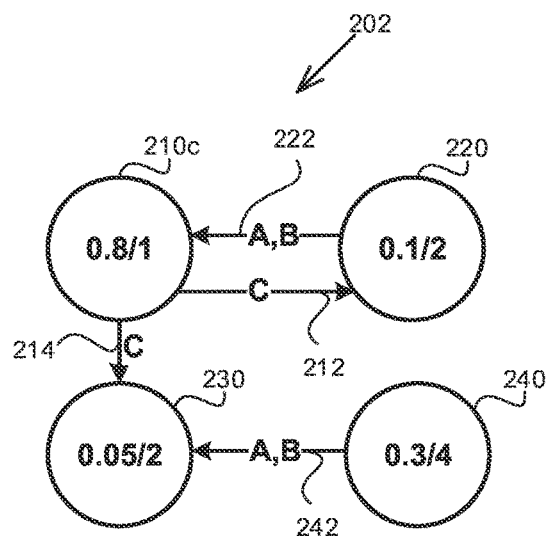
Figure 2C:
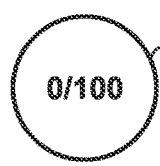
Figure 2D:
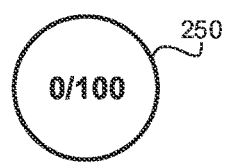

On Step 150b, mitigation actions may be activated and deactivated in view of the computed utilities of Steps 140 and 140b. It is noted that the mitigation actions may be deactivated Reference is now made to FIG. 1C showing a flowchart diagram of a method, in accordance with some exemplary embodiments of the disclosed subject matter.

On Step 120c, costs and reduction in usability may be updated. In some exemplary embodiments, costs and reduction in usability may be updated in view of actual usage of the system and network. As an example, usage log for each asset may be analyzed to determine whether a specific mitigation action would affect the usability and to what extent. For example, it may be determined whether a specific mitigation action would prevent activity that is performed routinely, often or the like with respect to the asset. As another example, if the mitigation action reduces usability with respect to an action that is rarely performed (e.g., performed below an average frequency threshold), it may be considered as not affecting usability at all, or reducing usability in a reduced manner. In some exemplary embodiments, in view of actual usage, weights may be provided to different mitigation actions with respect to different assets to modify their respective reductions in usability. In some exemplary embodiments, the same mitigation action may cause different reductions in usability for different assets, in view of the actual usage thereof.

On Step 130c, a set of mitigation actions to be implemented may be obtained, and the utility from implementation thereof may be computed on Step 140c. In some exemplary embodiments, in each iteration of Steps 130c-140c, a different set of mitigation actions may be analyzed to identify an optimal set of mitigation actions. In some exemplary embodiments, the set of mitigation actions may be examined with respect to the network in its original state, e.g., without any mitigation action activated therein. The original state may be the state that can be achieved by deactivating all activated mitigation actions. In some cases, some mitigation actions may not be deactivated, and may be considered as part of the "original" state of the network. In some exemplary embodiments, the original state may be the state that can achieved by automatically deactivating all the activated mitigation actions.

On Step 150c, an optimal set of mitigation actions—e.g., the set of mitigation actions providing the highest utility—may be applied. All mitigation actions that are not in the set but have been previously activated may be deactivated, and all mitigation actions that are present in the set may be activated. In some exemplary embodiments, the application of the optimal set of mitigation actions may be performed automatically, semi-automatically, or the like.

FIGS. 2A-2D show illustrations of graph of network lateral movements, in accordance with some exemplary embodiments of the disclosed subject matter.

Graph 200 includes five nodes (Nodes 210, 220, 230, 240, 250) representing five assets. Network lateral movement from assets are represented by Edges 212, 214, 222, 232, 242. The edges are labeled with techniques that can be employed to perform the network lateral movement (A,B,C,D). Each node is annotated with a probability of being penetrated and with a payload value of the asset. For example, Node 210 has a 0.1 probability of being penetrated and a payload value of 1. Node 250 has a significant payload (100), and therefore it is well protected. In this example, Node 250 has 0 probability of being directly penetrated. However, Node 250 may be penetrated using network lateral movements from other nodes.

Estimated loss from penetration may be computed for Graph 200, using the function $(G)=\Sigma_{\forall n} ELP(G, n)$. $ELP(G, n)$ is the estimated loss from penetration to asset n, which may be computed as $ELP(G,n)=p(n)\cdot\Sigma_{m\in Reach(n)}pl(m)$. In this case:

$$ELP(200,210)=0.1\cdot(1+2+2+100)=10.5$$

$$ELP(200,220)=0.1\cdot(1+2+2+100)=10.5$$

$$ELP(200,230)=0.05\cdot(2+100)=5.1$$

$$ELP(200,240)=0.3\cdot(4+2+100)=31.8$$

$$ELP(200,250)=0$$

As a result, $ELP(200)=57.9$.

Mitigation actions may be implemented to prevent activation of methods A,B,C,D or any combination thereof. Preventing only method A may not have any impact on the ELP value as it does not remove any edge. Similarly, preventing only method B may also not have any impact. It is noted, however, that in some embodiments, the probability of successfully traversing an edge may be affected by the fact that some techniques are removed, and therefore in such embodiments, ELP may be affected even without the removal of an edge.

Graph 201 exemplifies a modification in view of monitored events. As can be appreciated payload of Node 220b has increased to 50 instead of 2. As a result, it may be desired to prevent lateral movements to Node 220b. Accordingly, a mitigation action removing Edge 212 may be implemented, by preventing utilizing technique C to traverse from Node 210 to Node 220b.

Prior to the modification, the ELP value of the graph (denoted 201') may be as follows:

$$ELP(201',210)=0.1\cdot(1+50+2+100)=15.3$$

$$ELP(201',220)=0.1\cdot(50+1+2+100)=15.3$$

$$ELP(201',230)=0.05\cdot(2+100)=5.1$$

$$ELP(201',240)=0.3\cdot(4+2+100)=31.8$$

$$ELP(201',250)=0$$

As a result, $ELP(201')=67.5$.

After the dynamic implementation of the mitigation action, the ELP value of Graph 201 may be:

$$ELP(201,210)=0.1\cdot(1+2+100)=10.3$$

$$ELP(201,220)=0.1\cdot(50+1+2+100)=15.3$$

$$ELP(201,230)=0.05\cdot(2+100)=5.1$$

$$ELP(201,240)=0.3\cdot(4+2+100)=31.8$$

$$ELP(201,250)=0$$

As a result, $ELP(201)=62.5$.

Graph 202 exemplifies a different modification in view monitored events. In Graph 202, the payload utility remains unchanged, however, the probability of penetration of Node 210c is increased to 80%. After a predetermined elapsed time, it may be assumed that there's an increase in the probability that directly nearby nodes have been penetrated. In some exemplary embodiments, the nearby nodes may be nearby nodes that are directly reachable via a specific type of lateral movement. For example, in view of the monitored events, it may be determined there's an increased probability that an attacker that performs lateral movements using technique C but not technique B has penetrated the asset. Graph 203 exemplifies such a scenario. After the elapsed time passes, the penetration probability of nodes that are directly reachable using technique C from Node 210c may be increased by a value of 0.50. As a result, the probability of Node 230d is 55% and Node 220d—60%. In some exemplary embodiments, after additional elapsed time, the penetration probability of nodes reachable from Nodes 220d and 230d using technique C may be similarly increased. In some exemplary embodiments, as time passes, if there are no additional events associated with Node 210c, it may be determined that there's a higher likelihood that the previously identified event was a false positive notification, and the penetration probability of Node 210c may be decreased accordingly.

Additionally, or alternatively, follow-up events that occur after an initial event that indicates a potential breach may be monitored for. If follow-up events are identified, there's a higher likelihood that the indication was a true positive (e.g., the confidence measurement of the event resulting from a breach is increased), and the probability may be increased. Lack of follow-up events may be interpreted as decreasing the confidence measurement, reducing the likelihood that the indication was a true positive and increasing the likelihood that the indication was a false positive. Accordingly, the probability of penetration may be decreased to reflect the modified likelihood.

As can be appreciated, in view of the modification, different mitigation actions may be performed. There may be different ELP values for the different graphs, and accordingly a different set of mitigation actions may be activated (or deactivated).

Figure 3:
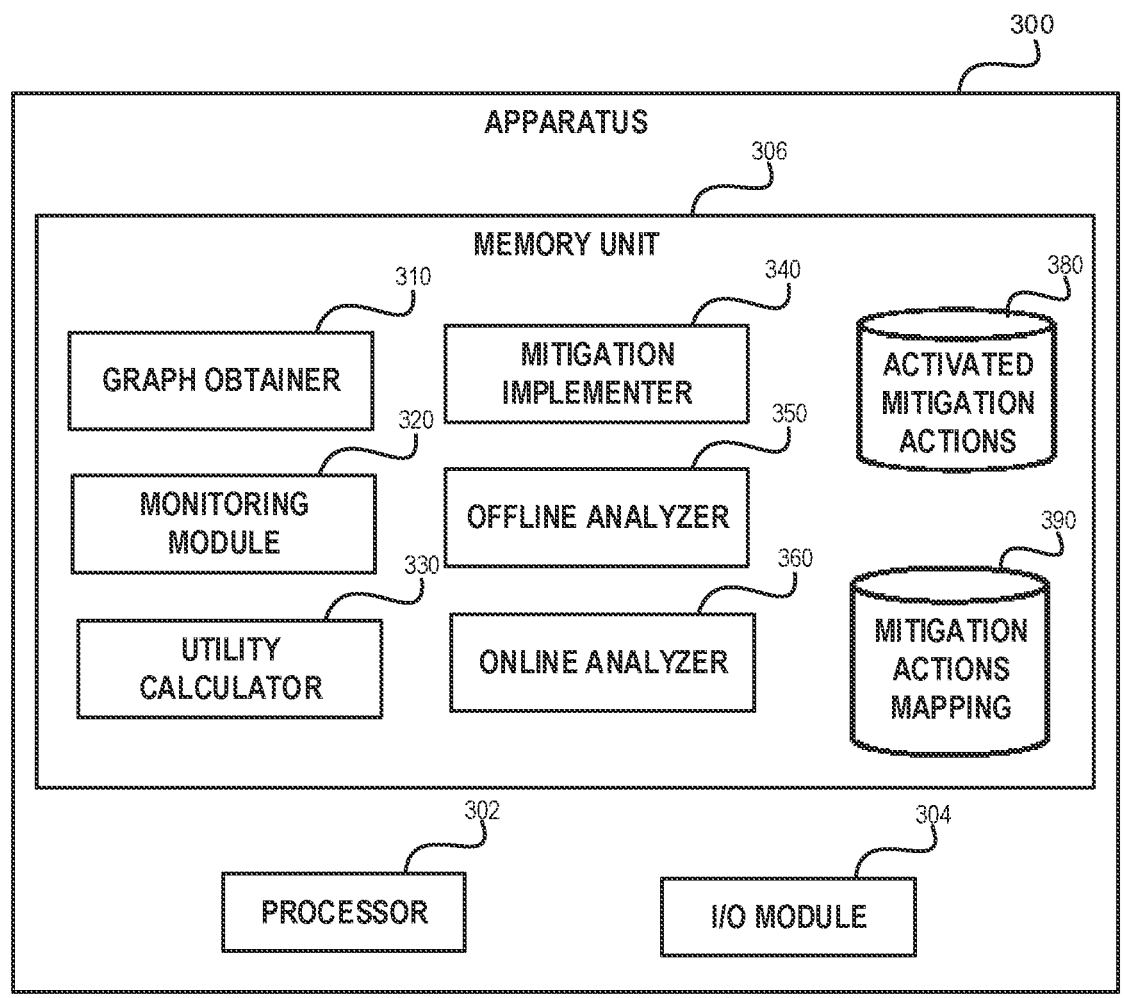
FIG. 3 shows a block diagram of an apparatus, in accordance with some exemplary embodiments of the disclosed subject matter.

Referring now to FIG. 3, showing an apparatus in accordance with some exemplary embodiments of the disclosed subject matter.

In some exemplary embodiments, Apparatus 300 may comprise one or more Processor(s) 302. Processor 302 may be a Central Processing Unit (CPU), a Graphical Processing Unit (GPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 304. I/O Module 304 may be utilized to provide an output to and receive input from a user, such as, for example displaying visualizations to users, providing alerts and notifications to users, receiving input from the user rejecting, accepting or modifying suggestions, obtaining rules, preferences or data from users, or the like.

In some exemplary embodiments, Apparatus 300 may comprise Memory Unit 306. Memory Unit 306 may be a hard disk drive, a Flash disk, a Random Access Memory (RAM), a memory chip, or the like. In some exemplary embodiments, Memory Unit 306 may retain program code operative to cause Processor 302 to perform acts associated with any of the subcomponents of Apparatus 300.

Memory Unit 306 may comprise one or more components as detailed below, implemented as executables, libraries, static libraries, functions, or any other executable components.

Graph Obtainer 310 may be configured to obtain a graph of network lateral movements. In some exemplary embodiments, Graph Obtainer 310 may receive, retrieve or the like, the graph from a third party, from a repository, or the like. Additionally, or alternatively, Graph Obtainer 310 may be configured to generate the graph based on static network analysis, dynamic network analysis, or the like.

Monitoring Module 320 may be configured to monitor for events related to the graph, usability, or the like. In some exemplary embodiments, Monitoring Module 320 may be configured to monitor for events indicative of potential breaches, determine confidence measurements thereof, or the like. Additionally, or alternatively, Monitoring Module 320 may be configured to monitor for events indicative of usage patterns relating to specific assets. Usage patterns may be useful in estimating reduction in usability from different mitigation actions. Additionally, or alternatively, Monitoring Module 320 may be configured to monitor for events indicative of a change in the payload utility of different assets.

In some exemplary embodiments, Utility Calculator 330 may be configured to determine quantitative utility from performing a mitigation action. Utility Calculator 330 may compute a utility function based on reduction in the estimated loss from penetration in view of the mitigation action. Additionally, or alternatively, the utility function may be computed based on the cost of applying the mitigation action and the reduction in usability due to the mitigation action. In some exemplary embodiments, cost of applying the mitigation action and reduction in usability may be obtained from a mapping, such as Mitigation Actions Mapping 390.

In some exemplary embodiments, Utility Calculator 330 may be utilized to compute the utility for performing a single mitigation action, a set of mitigation actions, or the like. In some exemplary embodiments, all potential combinations of mitigation actions that could be applied to affect any edge or node of the graph may be obtained, such as based on the Mitigation Actions Mapping 390. All potential combinations of such actions may be considered, and utilities thereof may be computed. Additionally, or alternatively, linear programming or other methods may be employed to determine a set of mitigation actions that maximizes the utility function. Additionally, or alternatively, the determined set of mitigation actions may also be subject to a limitation on the maximal cost of applying the mitigation actions, a limitation on the maximal reduction in usability, a limitation on the resources available for the determination of the set of mitigation action (e.g., looking for a local optimum that can be identified within a given timeframe for calculation), or the like.

In some exemplary embodiments, Mitigation Implementer 340 may be configured to implement one or more mitigation actions. The implementation of the mitigation actions may be performed in a fully automatic manner. Additionally, or alternatively, some manual work may be required, and Mitigation Implementer 340 may orchestrate and monitor the tasks required to be performed by human users. In some exemplary embodiments, Mitigation Implementer 340 may be configured to activate new mitigation actions and deactivate previously activated mitigation actions that are no longer needed.

In some exemplary embodiments, Offline Analyzer 350 may be configured to analyze the graph obtained by Graph Obtainer 310. Offline Analyzer 350 may identify bridge edges, connected components, or the like. In some exemplary embodiments, mitigation actions that disconnect connected components, such as by removing a bridge edge, may be investigated and utility thereof may be computed using Utility Calculator 330 and implemented using Mitigation Implementer 340. In some exemplary embodiments, Offline Analyzer 350 may determine a set of mitigation actions to be applied in view of the graph, as obtained from Graph Obtainer 310.

In some exemplary embodiments, Online Analyzer 360 may be configured to update the graph obtained by Graph Obtainer 310 in view of events identified by Monitoring Module 320. In some exemplary embodiments, Online Analyzer 360 may be configured to update probabilities, utilities, payloads, or the like, in the graph in view of monitored events (or lack thereof). In some exemplary embodiments, in view of the modified graph, Online Analyzer 360 may determine a new set of mitigation actions to be applied. In some exemplary embodiments, Online Analyzer 360 may deactivate previously activated mitigation actions. In some exemplary embodiments, Mitigation Implementer 340 may update Activated Mitigation Actions 380 to indicate each mitigation action that is activated and remains active. In some exemplary embodiments, Online Analyzer 360 may be configured to determine whether the activated mitigation actions should remain active or be deactivated. In some exemplary embodiments, in case a mitigation action is to be deactivated, Mitigation Implementer 340 may be utilized to deactivate the mitigation action. In some exemplary embodiments, Activated Mitigation Actions 380 may be updated to remove the deactivated mitigation action from the list of activated mitigation actions retained in such data repository.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a graph of network lateral movements, wherein the graph comprises nodes and directed edges, wherein each node of the graph represents a respective asset of a network, wherein a directed edge of the graph connecting a source node to a target node represents a network lateral movement from a source asset, represented by the source node, to a target asset, represented by the target node, wherein the graph indicates for a node at least one of: a payload utility of the node and a probability of penetration to the node;
detecting an event that affects the graph of network lateral movements, wherein the event affects at least one of: the payload utility of the node and the probability of penetration to the node;
updating the graph of network lateral movements based on the event, whereby obtaining a modified graph;
analyzing the modified graph to determine one or more mitigation actions to be applied, said analyzing the modified graph comprises computing utilities of applications of a plurality of mitigation actions, a utility of an application of a mitigation action being computed based on a reduction in an estimated loss from penetration that is computed as a summation of estimated losses from penetrations to each node of the graph, the estimated loss from penetration to the node being computed based on the probability of penetrating directly to the node and based on payload utilities of nodes that are reachable from the node; and
providing the one or more mitigation actions to be applied.

2. The method of claim 1, wherein said updating the graph of network lateral movements comprises: updating the probability of penetration directly to the node.

3. The method of claim 1, wherein said updating the graph of network lateral movements comprises: updating the payload utility of the node.

4. The method of claim 1, wherein said updating the graph of network lateral movements comprises: updating a probability of successful network lateral movement from the source node to the target node.

5. The method of claim 1, wherein said analyzing comprises analyzing a previously activated mitigation action; and wherein application of the one or more mitigation actions comprises deactivating the previously activated mitigation action.

6. The method of claim 1, wherein an edge in the graph of network lateral movements is associated with one or more methods enabling network lateral movements that comprise at least one of:
a Pass the Hash (PtH) technique;
a Pass the Ticket (PtT) technique;
a modification of a logon script;
a Remote Desktop Protocol (RDP) attack; and
a Server Message Block (SMB) relay attack.

7. The method of claim 1 further comprises:
prior to said detecting: performing an offline analysis to determine a set of one or more mitigation actions to be applied and applying the set of one or more mitigation actions;
wherein said analyzing comprises determining to activate a mitigation action not included in the set of one or more mitigation actions.

8. The method of claim 1 further comprises: monitoring usage of the network, wherein said detecting is performed in response to said monitoring, wherein said monitoring comprises identifying usage patterns, wherein said analyzing comprises determining estimated reduction in usability of a mitigation action based on the identified usage patterns.

9. The method of claim 1, further comprises:
detecting a second event that affects the graph of network lateral movements, wherein the second event affects at least one of: the payload utility of the node and the probability of penetration to the node;
updating the modified graph of network lateral movements based on the second event, whereby obtaining a second modified graph;
analyzing the second modified graph to determine at least one mitigation action to be applied; and
providing the at least one mitigation action to be applied.

10. The method of claim 1, wherein said analyzing the modified graph comprises:
selecting a subset of the plurality of mitigation actions based on the computed utilities of the applications; and
wherein said providing comprises applying the subset of the plurality of mitigation actions.

11. The method of claim 1, wherein said providing the one or more mitigation actions to be applied comprises automatically applying the one or more mitigation actions.

12. The method of claim 1, wherein said providing the one or more mitigation actions comprises outputting a suggestion to apply the one or more mitigation actions.

13. A non-transitory computer readable medium retaining program instructions, the program instructions, when read by a processor, cause the processor to perform:
obtaining a graph of network lateral movements, wherein the graph comprises nodes and directed edges, wherein each node of the graph represents a respective asset of a network, wherein a directed edge of the graph connecting a source node to a target node represents a network lateral movement from a source asset, represented by the source node, to a target asset, represented by the target node, wherein the graph indicates for a node at least one of: a payload utility of the node and a probability of penetration to the node;
detecting an event that affects the graph of network lateral movements, wherein the event affects at least one of: the payload utility of the node and the probability of penetration to the node;
updating the graph of network lateral movements based on the event, whereby obtaining a modified graph;
analyzing the modified graph to determine one or more mitigation actions to be applied, said analyzing the modified graph comprises computing utilities of applications of a plurality of mitigation actions, a utility of an application of a mitigation action being computed based on a reduction in an estimated loss from penetration that is computed as a summation of estimated losses from penetrations to each node of the graph, the estimated loss from penetration to the node being computed based on the probability of penetrating directly to the node and based on payload utilities of nodes that are reachable from the node; and providing the one or more mitigation actions to be applied.

14. The non-transitory computer readable medium of claim 13, wherein said updating the graph of network lateral movements comprises at least one of:
updating the probability of penetration directly to the node;
updating the payload utility of the node; and
updating a probability of successful network lateral movement from the source node to the target node.

15. The non-transitory computer readable medium of claim 13, wherein said analyzing comprises analyzing a previously activated mitigation action; and wherein application of the one or more mitigation actions comprises deactivating the previously activated mitigation action.

16. The non-transitory computer readable medium of claim 13, wherein the program instructions, when read by the processor, cause the processor to monitor usage of the network, wherein said detecting is performed in response to the monitoring, wherein the monitoring comprises identifying usage patterns, wherein said analyzing comprises determining an estimated reduction in a usability of a mitigation action based on the identified usage patterns.

17. The non-transitory computer readable medium of claim 13, wherein said analyzing the modified graph comprises:
selecting a subset of the plurality of mitigation actions based on the computed utilities of the applications; and
wherein said providing comprises applying the subset of the plurality of mitigation actions.

18. An apparatus comprising a memory storing instructions and a processor coupled to the memory, the processor is configured to perform:
obtaining a graph of network lateral movements, wherein the graph comprises nodes and directed edges, wherein each node of the graph represents a respective asset of a network, wherein a directed edge of the graph connecting a source node to a target node represents a network lateral movement from a source asset, represented by the source node, to a target asset, represented by the target node, wherein the graph indicates for a node at least one of: a payload utility of the node and a probability of penetration to the node;
detecting an event that affects the graph of network lateral movements, wherein the event affects at least one of: the payload utility of the node and the probability of penetration to the node;
updating the graph of network lateral movements based on the event, whereby obtaining a modified graph;
analyzing the modified graph to determine one or more mitigation actions to be applied, said analyzing the modified graph comprises computing utilities of applications of a plurality of mitigation actions, a utility of an application of a mitigation action being computed based on a reduction in an estimated loss from penetration that is computed as a summation of estimated losses from penetrations to each node of the graph, the estimated loss from penetration to the node being computed based on the probability of penetrating directly to the node and based on payload utilities of nodes that are reachable from the node; and
providing the one or more mitigation actions to be applied.

* * * * *